United States Patent
Mankoff et al.

[11] 3,729,653
[45] Apr. 24, 1973

[54] GROUND CONDUCTOR CONTINUITY CHECKING CIRCUIT

[75] Inventors: Lawrence L. Mankoff, Broomall, Pa.; Thomas S. Spinanger, Haddonfield, N.J.

[73] Assignee: General Electric Company, Philadelphia, Pa.

[22] Filed: Nov. 8, 1971

[21] Appl. No.: 196,287

[52] U.S. Cl. ................................317/18 C, 317/52
[51] Int. Cl. ...............................................H02h 1/02
[58] Field of Search ....................317/18 C, 18 D, 52; 340/253 M, 253 N, 255, 256

[56] References Cited

UNITED STATES PATENTS

| | | | |
|---|---|---|---|
| 3,196,316 | 7/1965 | Crom | 317/18 C |
| 3,072,827 | 1/1963 | Benish | 317/18 C |
| 3,308,346 | 3/1967 | Martzloff | 317/18 D |
| 3,496,416 | 2/1970 | Agnew | 317/18 C |
| 3,522,479 | 8/1970 | Parker | 317/18 D |

*Primary Examiner*—D. F. Duggan
*Assistant Examiner*—Harvey Fendelman
*Attorney*—J. Wesley Haubner et al.

[57] ABSTRACT

In a fail-safe ground conductor continuity monitoring circuit, including means for inserting a low-level monitoring current into a ground conductor and receiver means for sensing if the level of current in the ground conductor is below a predetermined level, and for tripping a system circuit breaker if the current is below that level for a predetermined time, impedance means is connected to the ground conductor to deter the monitoring current from flowing into a stray path shunting the ground conductor.

6 Claims, 1 Drawing Figure

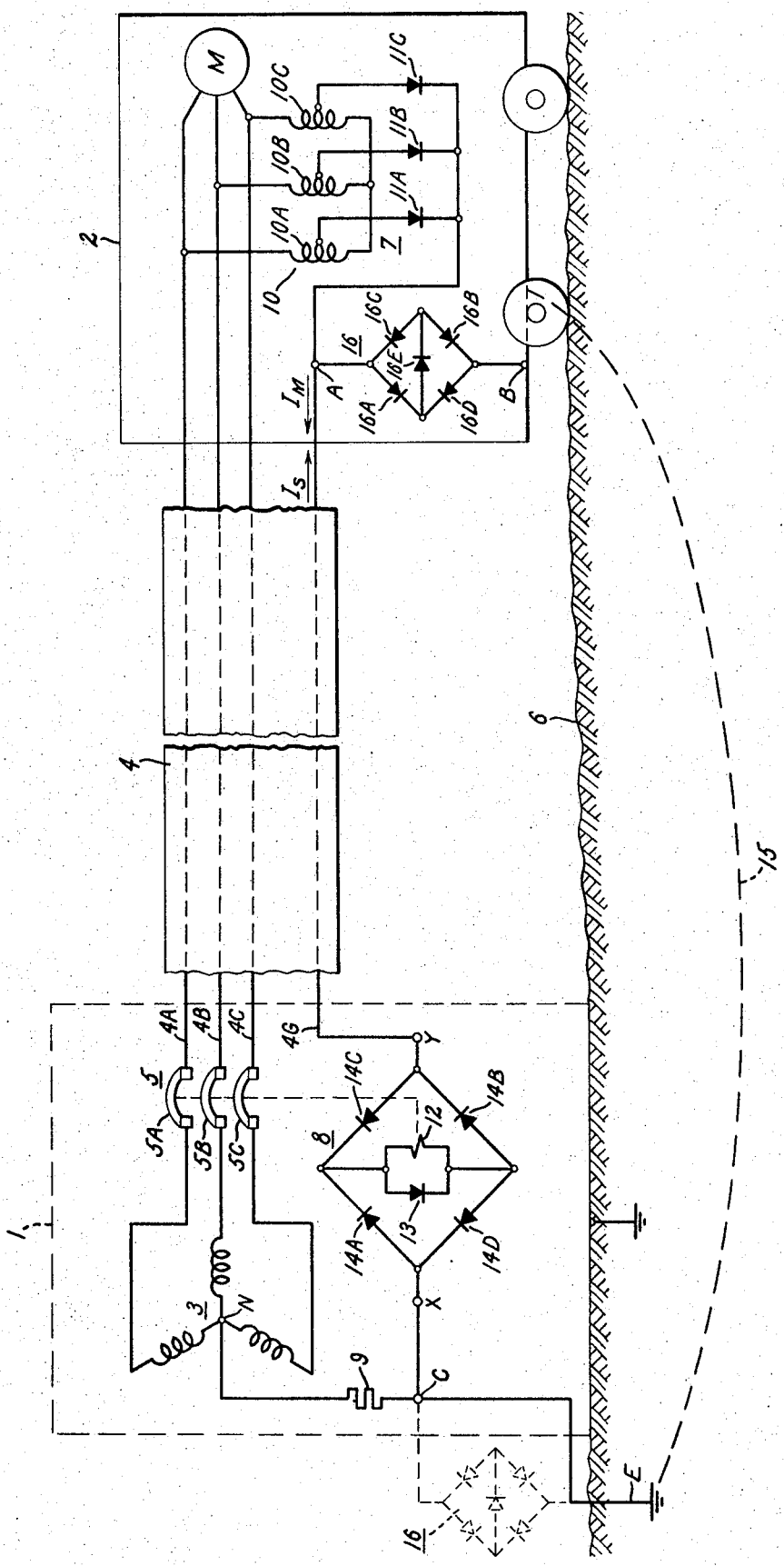

GROUND CONDUCTOR CONTINUITY CHECKING CIRCUIT

BACKGROUND AND OBJECTS OF THE INVENTION

This invention relates generally to electrical protective circuitry, and more particularly it relates to fail-safe ground wire continuity checking circuitry. The following published art, now known to applicant, is exemplary of prior art approaches relevant in this area of technology: U.S. Pat. No. 3,072,827 (Benish); U.S. Pat. No. 3,131,329 (Braun); U.S. Pat. No. 3,196,316 (Crom); U.S. Pat. No. 3,335,324 (Buckeridge) and U.S. Pat. No. 3,492,533 (Thurston).

In electrical equipment, particularly A-C equipment utilized in the mining industry, it is of utmost importance to adequately ground equipment in the furtherance of personnel and operating safety.

In most mines, power is normally provided to A-C mobile mining equipment via a long insulated trailing cable connected to a circuit breaker located at an electric power load center. The circuit breaker is operative for interrupting the flow of current to the mobile equipment upon command. The cable includes a ground conductor in addition to the phase conductors. The ground conductor is connected to the machine frame and serves to provide a path through which a fault current can flow to an earth connection located some distance from the mobile machine.

To assure that the mining machine is adequately grounded at all times, the continuity of the ground line from the machine to the load center should be continuously monitored. In the event of a break in the ground conductor, the circuit breaker should open to quickly deenergize the mobile machine. It should be appreciated if a line-to-ground short circuit exists in the mining machine, and if the ground conductor is broken, the frame of the machine will rise to the line voltage, thereby exposing operating personnel to a shock hazard. Accordingly, it is desirable to provide a continuous ground continuity checking circuit which quickly responds to the detection of a discontinuity in the ground conductor and which initiates a tripping cycle in the load center circuit breaker to deenergize the mine machine in response to the detection of such a discontinuity.

In copending application Ser. No. 184,354, filed on Sept. 28, 1971 by William C. Kotheimer and assigned to the same assignee as the present application, there is disclosed and claimed improved circuitry for continuously monitoring the continuity of the ground conductor and for causing a system circuit breaker to trip if the conductor breaks. The circuitry to accomplish that result includes means for producing a unidirectional monitoring current and passing it through the ground conductor and a receiver including relay means for sensing the presence of such current and for initiating a tripping cycle of the system's circuit breaker whenever the magnitude of the current flowing through the ground conductor is below the predetermined level for a predetermined period of time. According to Kotheimer, the receiver also includes rectifying means coupled to the relay for insuring that any stray current which may flow through the ground wire will not flow in opposition to the monitoring current in the relay, thereby minimizing the possibility of spurious tripping of the system circuit breaker.

In typical mining systems there are numerous ground paths shunting the ground conductor. The following are merely two of many possible shunt paths which may exist singly or in combination in any given mining system:

1. In underground mines the accumulation of moisture and salt in the earth may make the earth sufficiently conductive to divert monitoring current from the ground conductor; and
2. The rails upon which D-C operated mine railway equipments operate will form another path shunting the ground conductor if the A-C equipment to which the ground conductor is connected comes in contact with the D-C railway equipment. Such indigenous shunt paths may act to siphon off all or a portion of the monitoring signal provided to the ground conductor, whereupon tripping of the system circuit breaker may occur even though the ground conductor is intact. In the interest of economy it is desirable to minimize if not preclude spurious tripping resulting from stray conductive paths shunting the ground conductor.

Accordingly, it is the general object of our invention to provide an extremely reliable ground continuity checking circuit for power systems.

It is a further object of our invention to provide means for use in a ground continuity checking circuit of a power system which reduces the effect of shunt paths indigenous to the power system's environment.

It is a further object of our invention to provide relatively simple means which may be connected in a ground continuity checking circuit for a power system at various locations therein and which minimizes the effect of conductive shunt paths indigenous to the power system's environment.

SUMMARY OF THE INVENTION

In carrying out our invention in one form, in a power system including electrical protection circuitry for monitoring the continuity of a ground conductor, which circuitry includes means for introducing a monitoring signal into the ground conductor and receiver means connected therein for monitoring the signal level therethrough and for causing a system circuit breaker to open whenever the magnitude of the signal monitored by the receiver is below a predetermined level for a predetermined period of time, we provide nonlinear impedance means connected to the ground conductor for deterring the monitoring current from flowing through any stray conductive paths which may be indigenous to the power system's environment.

BRIEF DESCRIPTION OF THE DRAWING

Our invention will be better understood and its various objects and advantages will be more fully appreciated from the following description taken in conjunction with the accompanying drawing which is a schematic diagram of a power system for mining applications.

DETAILED DESCRIPTION OF THE PREFERRED EMBODIMENT

The drawing shows a portion of a power system particularly adapted, although not limited to, mining applications. As can be seen, grounded mine load center 1 provides a three-phase, A-C power to a remote mobile mining machine 2. Power is supplied to the mobile machine from a three-phase transformer 3 in the load center via an insulated cable 4. Cable 4 contains power conductors 4A, 4B and 4C and a ground conductor 4G. The ground conductor is electrically coupled at one end thereof to the frame of the mobile mining machine and is coupled at the other end thereof to a remote earth connection E.

In service the cable 4 will be flexed a great number of times and dragged over relatively rough terrain (i.e., earth 6) as the mobile machine 2 is operated in the mine such that the ground wire may be cut or broken, thereby destroying the ground integrity of the system.

Serious shock hazard to personnel may arise at the machine where the ground integrity between the machine and the load center fails. In such circumstances personnel coming in contact with the mobile machine may receive a lethal shock in the event that, for example, a power conductor becomes shorted to the frame of the machine. Furthermore, the absence of ground integrity in an ungrounded mining application creates a condition fraught with the peril of fire and/or gas explosions resulting from electrical arcing under fault conditions. Accordingly, it is of utmost importance to provide a power system with a fail-safe ground continuity monitoring circuit which causes deenergization of the mobile mining machine in the event that the integrity of the ground system is compromised.

To that end, there is provided a continuously monitored ground continuity check circuit adapted for initiating a tripping cycle of the system circuit breaker in rapid response to the detection of a discontinuity in the ground wire 4G. The circuit includes a transmitter 7 which is preferably disposed on the mobile mining machine 2 and which is adapted for introducing a low level monitoring signal, $I_M$, into the system ground conductor. A sensitive receiver 8 is connected in the ground conductor 4G in the mine load center and monitors the presence of the injected signal $I_M$ and in the event of its absence (which would be indicative of a ground conductor discontinuity) causes the system circuit breaker to open.

A grounding resistor 9 is connected to the neutral N of the system transformer 3 and to the ground conductor 4G at node point C. The function of the grounding resistor is to limit any line-to-ground fault current which may begin flowing.

Transmitter 7 comprises a wye connected three phase autotransformer 10 having intermediate taps on each phase winding connected through diodes 11A, 11B and 11C to a neutral terminal A to which the ground conductor 4G is also connected. The transformer 7 and diodes 11A, 11B and 11C provide a rectified low signal voltage which impresses upon the ground conductor 4G a unidirectional signal current $I_m$ having an A-C component or ripple.

The D-C signal $I_M$ is inserted into the ground conductor 4G. At the mine load center 1, the ground conductor 4G is connected to a terminal Y of the receiver 8. A companion terminal X of the receiver is connected to ground via a circuit which exhibits relatively low impedance to ground current in the ground conductor, and it is also connected to the neutral N of the system transformer 3 via conductive means comprising the grounding resistor 9. The D-C signal $I_M$ will therefore circulate through the ground conductor 4G, the receiver 8, the resistor 9, and back to the transmitter 7 by way of the power conductors 4A, 4B and 4C. The receiver itself presents a low impedance to ground current, and this insures that the potential on the frame of the machine 2 is not raised appreciably above ground.

The receiver 8 includes a relay which is operative, when the current through its coil 12 is below a predetermined deenergization level for a predetermined period of time, for closing the tripping mechanism (not shown) of system circuit breaker 5 to open its contacts 5A, 5B and 5C, thereby deenergizing the mobile mining machine 2.

During normal operation of the power system with the ground conductor intact, the current through the relay will be above the deenergization level. If the ground wire were broken, the absence of current flow through the relay coil will cause the relay to drop out and initiate a tripping cycle of the system circuit breaker.

As can be seen, relay coil 12 is shunted by diode 13. The function of the diode 13 is to clamp the voltage appearing across the relay coil 12. In so doing the relay is protected from sustaining injury in the event that high level current (e.g., fault current) flows through the ground conductor. The receiver also includes 4 diodes, namely, 14A, 14B, 14C and 14D, arranged to form a bridge rectifier 14. The rectifier serves to assure that relay coil 12 is only subjected to unidirectional current even though an externally originated stray current $I_S$ may be flowing through the ground wire in a direction opposite to the direction of the monitoring current $I_M$. In so doing the possibility of spurious tripping is minimized if not precluded.

In the environment in which the subject power system is normally located, there are stray conductive paths which shunt the ground conductor, as directly through ground or through the vehicle wheels and tracks from point B at the load location to point C at the source location. This is particularly true in coal mines. One of such shunt paths is shown schematically in the drawing by the broken line 15. This path represents a relatively low impedance path through the moist, saline earth commonly extant in an underground coal mine. It has been found that with terminal A connected directly to the vehicle frame at B the monitoring signal $I_M$ produced by the transmitter 7 sometimes tends to flow through a stray path such as 15 in lieu of through the ground conductor 4G. If a sizable portion of the monitoring signal $I_M$ is diverted into the stray path, the signal level sensed by the relay of receiver 8 may fall below the deenergization level of the relay and remain so for a sufficient time for the relay to drop out and thereby initiate a false tripping operation of the system circuit breaker 5.

In the interest of mining economy the possibility of such spurious tripping occurring should be minimized if not precluded.

Our invention serves to deter the monitoring current from being diverted from the ground conductor to the stray conductive path and in so doing it eliminates spurious tripping resulting from the effect of such stray paths. We accomplish this function through the use of a nonlinear impedance element adapted to be inserted in all the undesired stray shunt paths at any one or more of several critical locations.

As can be seen, a diode bridge 16, formed of diodes 16A, 16B, 16C, 16D and 16E, is connected to the ground conductor 4G at point A and is connected to the frame of the mobile mining machine 2 at point B. In this location the bridge 16 serves as the interconnection or juncture between the ground conductor and the frame of the machine, and it is consequently disposed in the path that any current between the transmitter 7 and the stray path 15 must follow. The diode bridge is a non-linear impedance device. By this we mean the diodes form a bidirectional conducting bridge which presents a relatively high impedance to low signal levels while presenting a relatively low impedance to high signal levels. Since the level of the monitoring current $I_M$ is relatively low the resulting relatively high impedance presented by the diode bridge 16 acts to deter the stray path 15 from siphoning off a substantial portion of current $I_M$.

It should be appreciated that in normal operation (i.e., low levels of $I_M$) the voltage drop across the receiver 8 (i.e., the voltage between points X and Y) is the sum of the voltage drops across diodes 14A, 14B and the relay coil 12, or across diodes 14C, 14D and the relay coil 12, whereas the voltage drop across the diode bridge 16 is the sum of the voltage drops across diodes 16A, 16B and 16E, or across diodes 16C, 16D and 16E. Proper selection of the diode parameters for the diode bridge 16 to insure that the voltage drop across it is greater than the voltage drop across the receiver 8 will insure that a sufficient portion of the monitoring current will pass through the ground conductor to keep the relay energized and thereby preclude spurious tripping. Furthermore, the maximum voltage drop across impedance 16 when traversed by high current in either direction (due to a phase-to-frame short circuit or fault) is less than three volts which is not high enough to cause the potential of the frame 2 to reach a dangerous level with respect to ground.

Although we presently prefer to connect the diode bridge 16 between the ground conductor and the frame of the machine 2, an alternate connection for the bridge circuit is shown in phantom lines as being between node C on the ground conductor and the remote earth connection E. It is to be understood that if an impedance element 16 is inserted between points C and E the direct connection therebetween would be eliminated. As should be appreciated, in either location the diode bridge is, nevertheless, in the stray conductive path where it will act to deter the diversion of the monitoring signal from the ground conductor 4G. If desired impedance elements 16 may be used at both the locations shown.

While we have shown the non-linear impedance to comprise the diode bridge, we, nevertheless, contemplate the use of other circuits or components which exhibit a relatively high impedance to low signal levels and a relatively low impedance to high A-C signal levels. The former criteria is important to make sure the monitoring signal prefers the ground conductor 4G rather than the stray path 15. The latter criteria is important: (1) when the impedance is connected between the ground conductor and the machine frame, to prevent the frame from rising to a high voltage level in the event of a phase-to-frame fault in the mobile mining machine; or (2) when the impedance is connected between the ground resistor node on the ground conductor and the remote earth connection E, to prevent the mine load center housing from rising to a high voltage level in the event of a line-to-ground fault in the load center.

If a linear impedance were utilized in lieu of the non-linear impedance as described above, while such an arrangement may in normal operation deter the divergence of monitoring current from the ground conductor, in a phase-to-frame fault condition the high level of fault current passing through the impedance might raise the voltage on either the frame of the mobile machine or on the housing in the mine load center (depending upon the location of the impedance) to a dangerously high level.

While we have shown and described a particular embodiment of our invention, it will be obvious to those skilled in the art that various changes and modifications may be made without departing from our invention in its broader aspects; and we, therefore, intend herein to cover all such changes and modifications as fall within the true spirit and scope of our invention.

What we desire to secure by Letters Patent of the United States is:

1. In a system for supplying electric current through a power circuit including a flexible cable from a fixed source location including a power circuit interrupter to a remote load location in an environment characterized by the presence of undesired stray conductive paths between said locations, a discrete ground conductor extending between said source and load locations, means normally passing a signal current through said ground conductor between said locations, means responsive to presence of said signal current for monitoring the integrity of said ground conductor, said signal responsive means actuating said circuit interrupter to disconnect said power circuit whenever said signal current falls below a predetermined minimum magnitude, and non-linear impedance means connected between said ground conductor and said stray paths at at least one of said locations, said impedance means being effective to ensure that at least said predetermined minimum magnitude of signal current flows through said ground conductor when the conductor is intact, whereby said circuit interrupter does not unnecessarily interrupt said power circuit as a result of current flow through stray paths shunting said ground conductor.

2. The power system as specified in claim 1 wherein said non-linear impedance means exhibits a high impedance for low signal levels therethrough and a low impedance for high signal levels therethrough.

3. The power system as specified in claim 2 wherein said load device comprises electrical equipment mounted on a frame and wherein said non-linear impedance means is connected between said ground conductor and said frame.

4. The power system as specified in claim 2 wherein said system includes a grounding resistor connected between a neutral terminal of said power circuit and said ground conductor at said source location and said non-linear impedance means is connected between said terminal and an earth connection.

5. The power system as specified in claim 3 wherein said non-linear impedance means comprises a first, second, third, fourth and fifth diodes arranged in a bridge configuration, the cathodes of said first and third diodes being connected together and to the anode of said fifth diode, the anode of said fourth and second diodes being connected together and to the cathode of said fifth diode, the anode of said first diode being connected to the cathode of said fourth diode at a second point, the anode of the third diode being connected to the cathode of said second diode at a third point, said second point being connected to said ground conductor, said third point being connected to said frame.

6. The power system as specified in claim 4 wherein said non-linear impedance means comprises a first, second, third, fourth and fifth diodes arranged in a bridge configuration, the cathodes of said first and third diodes being connected together and to the anode of said fifth diode, the anode of said fourth and second diodes being connected together and to the cathode of said fifth diode, the anode of said first diode being connected to the cathode of said fourth diode at a second point, the anode of the third diode being connected to the cathode of said second diode at a third point, said second point being connected to said neutral terminal and said third point being connected to said earth connection.

* * * * *